(12) United States Patent
Amarilio et al.

(10) Patent No.: US 9,619,070 B2
(45) Date of Patent: Apr. 11, 2017

(54) VALIDATING A PHYSICAL TOUCH EVENT IN OPTICAL TOUCH SCREENS

(71) Applicant: ELBIT SYSTEMS LTD., Haifa (IL)

(72) Inventors: Errikos Amarilio, Kiryat Ata (IL); Avishai Potashnik, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 14/426,992

(22) PCT Filed: Sep. 10, 2013

(86) PCT No.: PCT/IL2013/050760
§ 371 (c)(1),
(2) Date: Mar. 10, 2015

(87) PCT Pub. No.: WO2014/037951
PCT Pub. Date: Mar. 13, 2014

(65) Prior Publication Data
US 2015/0309639 A1    Oct. 29, 2015

Related U.S. Application Data

(60) Provisional application No. 61/717,752, filed on Oct. 24, 2012.

(30) Foreign Application Priority Data

Sep. 10, 2012 (IL) .......................... 221862

(51) Int. Cl.
*G06F 3/045* (2006.01)
*G06F 3/041* (2006.01)
(Continued)

(52) U.S. Cl.
CPC ............ *G06F 3/0414* (2013.01); *G06F 3/016* (2013.01); *G06F 3/041* (2013.01); *G06F 3/042* (2013.01);
(Continued)

(58) Field of Classification Search
CPC ...... G06F 3/042; G06F 3/0414; G06F 3/0421; G06F 3/043; G06F 3/044;
(Continued)

(56) References Cited

U.S. PATENT DOCUMENTS 5,510,813 A    4/1996   Makinwa et al.
5,801,682 A *  9/1998   Coni ....................... G06F 3/041
                                                        178/18.06

(Continued)

FOREIGN PATENT DOCUMENTS

EP    1798635      6/2007
WO    WO 0235461   5/2002

OTHER PUBLICATIONS

International Search Report of PCT Application No. PCT/IL2013/050760 dated Dec. 19, 2013.
(Continued)

*Primary Examiner* — Vijay Shankar
(74) *Attorney, Agent, or Firm* — Pearl Cohen Zedek Latzer Baratz LLP

(57) ABSTRACT

A hybrid optical-physical touch screen is provided herein. The touch screen includes: an electronic panel display; one or more optical sensors coupled to the electronic panel display and configured to determine, a spatial location of a physical object on an X-Y plane near the electronic panel display; a plurality of physical touch sensors coupled to the electronic panel display and configured to determine, a physical touch event between the physical object and the electronic panel display; and a processor configured to compare the determined spatial location of the physical object with the determined physical touch event between the physical object and the display at a same time, and determine, based on predefined parameters, whether an inten-
(Continued)

tional physical touch event between the physical object and the electronic panel display has occurred.

19 Claims, 2 Drawing Sheets

(51) Int. Cl.
    *G06F 3/042*     (2006.01)
    *G06F 3/01*     (2006.01)
    *G06F 3/043*     (2006.01)
    *G06F 3/044*     (2006.01)

(52) U.S. Cl.
    CPC .............. *G06F 3/043* (2013.01); *G06F 3/044* (2013.01); *G06F 3/045* (2013.01); *G06F 3/0412* (2013.01); *G06F 3/0421* (2013.01); *G06F 2203/04101* (2013.01); *G06F 2203/04105* (2013.01); *G06F 2203/04106* (2013.01)

(58) Field of Classification Search
    CPC . G06F 2203/04101; G06F 2203/04105; G06F 2203/04106
    USPC ................................................. 345/173–178
    See application file for complete search history.

(56) References Cited

U.S. PATENT DOCUMENTS

| | | | |
|---|---|---|---|
| 6,492,979 B1 * | 12/2002 | Kent | ..................... G06F 3/0414 178/18.01 |
| 6,504,530 B1 | 1/2003 | Wilson et al. | |
| 2012/0223900 A1 | 9/2012 | Jiyama et al. | |

OTHER PUBLICATIONS

Supplementary European Search Report of EP application No. 13835825, mailed on Mar. 16, 2016.

\* cited by examiner

VALIDATING A PHYSICAL TOUCH EVENT IN OPTICAL TOUCH SCREENS

CROSS-REFERENCE TO RELATED APPLICATIONS

This application is a National Phase Application of PCT International Application No. PCT/IL2013/050760, International Filing Date Sep. 10, 2013, claiming priority of Israeli Patent Application No. 221862, filed Sep. 10, 2012, and claiming the benefit of U.S. provisional Patent Application No. 61/717,752, filed Oct. 24, 2012, all of which are hereby incorporated by reference.

BACKGROUND

1. Technical Field

The present invention relates to electronic panel displays and more particularly, to such displays with touch sensors.

2. Discussion of the Related Art

Prior to setting forth the background of the invention, it may be helpful to set forth definitions of certain terms that will be used hereinafter.

The term "physical touch event" as used herein refers to an actual physical contact initiated by a user, between a user or an object held by the user, and a display panel. The outcome effect of such an impact may result with any of the following measurable metrics: force/pressure change, bending, deflection, shockwave, acoustic pulse/wave, dispersive signal, and the like.

The term "physical touch sensors" as used herein refers to any type of sensors that are configured to measure any of the aforementioned measurable metrics associated with the various types of the outcome effect of the physical touch event.

The use of touch screens on board airborne platforms has recently become very popular with the introduction of flat panel displays. One form of touch screens is based on optical imaging technology (hereinafter: optical touch screens). Optical touch screens usually include one or more set of optical sensors positions along the circumference of the display. In combination with a processor, the optical sensors determine the spatial position of the hand or finger the user or any object held by the user. By determining an optical touch plane, which is usually parallel to the actual screen, any crossing of that optical touch plane is considered as a touch event. One drawback of the optical touch screen is that the optical touch plane is displaced, from the actual screen and so the optical touch screen detects a touch event before a physical touch event has occurred.

A range of technologies are used today in order to implement touch screen that are based on detecting a physical touch event. Piezoelectric sensors for example are used as pressure or acceleration sensors. Using a computer processor and algorithms, the location of the hand or an object held by it, may be determined Other physical touch sensors technologies such as capacitive and resistive sensors are also widely used. The capacitive and resistive sensors tend to be placed on transparent layer on the side of display panel facing the user and are known to cause a certain degradation of the quality of the image displayed by the panel display. Other types of sensors configured to measure the aforementioned metrics of the physical touch event are also known.

Displays intended for use in harsh environments such as airborne platforms, military vehicles, and the like are affected by vibrations and shocks during normal operation. Consequently, any touch screen that is based on recognizing the actual contact or impact of a physical object with the display may be interfered by the aforementioned vibrations. It would be advantageous to provide a method or a device for validating a physical touch event in optical touch screen, in which a user has intentionally caused a physical touch event.

BRIEF SUMMARY

One aspect of the invention provides a hybrid optical-physical touch screen configured for validating an intentional touch event. The hybrid optical-physical touch screen includes: an electronic panel display; one or more optical sensors coupled to the display and configured to determine, a spatial location of a physical object on an X-Y plane near the display; a plurality of physical touch sensors coupled to the display and configured to determine, a level of measurable metric of physical touch applied by the physical object to the display; and a processor configured compare the determined spatial location of the physical object on the X-Y plane near the display with the determined level of physical touch applied by the physical object to the display at a same time, and determine, based on predefined parameters, whether an intentional physical touch event by the physical object has occurred.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
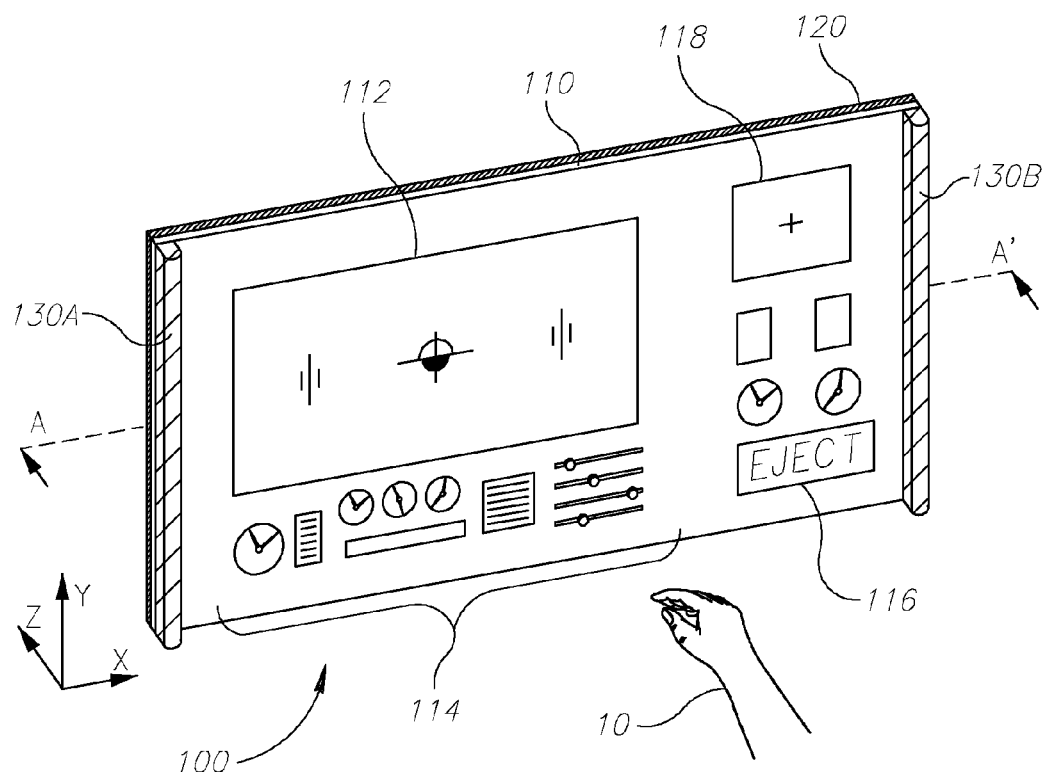
FIG. 1 is a perspective view showing an exemplary embodiment of the hybrid touch screen in accordance with the present invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a perspective view showing an exemplary embodiment of the hybrid touch screen 100 configured for validating intentional physical touch events by a user or physical objects held by the user, as opposed to a non-touch events such as a stray object falling near hybrid touch screen 100 or mechanical vibrations affecting hybrid touch screen 100.

Hybrid optical-physical touch screen 100 includes an electronic panel display 110 and one or more optical sensors 130A and 130B coupled to electronic panel display 110 and configured to determine a spatial location of a physical object (such as a hand 10 of a user) on an X-Y plane near electronic panel display 110. Hybrid optical-physical touch screen 100 further includes a plurality of physical touch sensors 120 coupled to electronic panel display 110 and configured to determine, physical touch signals applied by the physical object to electronic panel display 110.

Hybrid optical-physical touch screen 100 further includes a computer processor (not shown) configured compare the determined spatial location of the physical object on the X-Y plane near electronic panel display 110 with the determined level of physical touch signals applied by the physical object to electronic panel display 110 at a same time, and determine, based on predefined parameters which may be updated or provided in real time, whether an intentional physical touch event between the physical object and electronic panel display 110 has occurred.

As noted, the computer processor uses predefined parameters in determining the nature and also the actual occurrence of the touch event. Specifically, in some cases, even when a physical object is determined at a specified X-Y location, a touch event is not determined because a minimal level of physical touch signals that is associated with an intentional physical touch event by the physical object has not been measured by physical touch sensors 120. Advantageously, the use of physical touch sensors 120 as discussed herein is beneficial in reducing occurrences of premature detections of touch events that are due to the physical gap between the optical touch plane and the actual touch plane, when using optical sensors 130 alone.

According to some embodiments of the present invention, the predefined parameters include predefined set of ranges of level of physical touch signals, each range associated with a different X-Y location on the display. For example, an "Eject" button 116 may be activated if and only if a force of above 5 kg is measured at its specified X-Y location. Similarly, the portion of electronic panel display 110 which contain several functions 114 necessitates significantly lower levels of physical touch signals whereas zooming a sub screen such as 112 or 118 requires no physical touch signals at all. Once the position of the physical object is determined, the validation of the necessary force level is being validated based on either location or application functionality as being displayed at the specified X-Y location over electronic panel display 110.

Advantageously, in some embodiments, in order to maintain a high quality image, physical touch sensors 120 are positioned along a circumference of the electronic display panel so as to not interfere with a viewable portion of the electronic panel display.

Advantageously, the aforementioned logic may be implemented in other architectures to achieve the same effect of a method of validating a deliberate touch event in an optical touch screen. Such a method may include the following steps: detecting an X-Y position of a physical object facing the optical touch screen; obtaining physical touch signals affecting the electronic display panel; comparing the X-Y position with the obtained physical touch signals; and determining, based on the comparison and predefined parameters, whether a deliberate touch event by the physical object has occurred.

Figure 2:
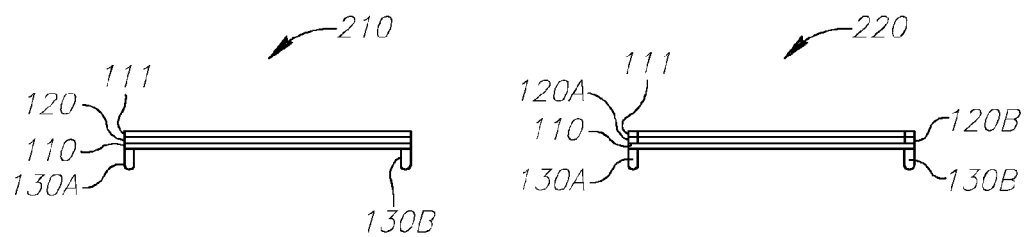
FIG. 2 shows several cross sections of different embodiments of the hybrid touch screen in accordance with the present invention.
Figure 2:
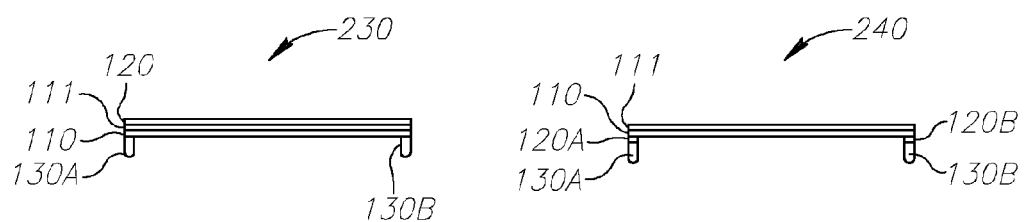

FIG. 2 shows several cross sections along the A-A' axis of FIG. 1 of different embodiments of the hybrid touch screen in accordance with the present invention. Touch screen configuration 210 illustrates electronic panel display 110, optical sensors 130, and a layer of physical touch sensors 120 located between electronic panel display 110 and a back light layer 111. Touch screen configuration 220 illustrates electronic panel display 110, optical sensors 130, and physical touch sensors 120A and 120B located only along the circumference of electronic panel display 110 between electronic panel display 110 and a back light layer 111 so as not to degrade the quality of the image.

Touch screen configuration 230 illustrates electronic panel display 110, optical sensors 130, and a layer of physical touch sensors 120 located behind a back light layer 111. In this configuration, a layer of resistive sensors 120 had been demonstrated by the inventor to be sufficiently sensitive to measure a physical touch event applied to the other side of the touch screen, i.e., to electronic panel display 110.

Touch screen configuration 240 illustrates electronic panel display 110, optical sensors 130, and physical touch sensors 120A and 120B located only along the circumference of electronic panel display 110 on its frontal side. It is understood that many other configurations are available. The aforementioned embodiments are provided herein by way of example only and not by way of limitation. In all configurations discussed above, physical touch sensors 120 may be selected so as to measure a mechanical frequency of the electronic panel display 110. Measuring a mechanical frequency of over a specified threshold such as 10 Hz may be indicative of mechanical vibrations. Conversely, measuring mechanical frequency of below 10 Hz may be indicative of a physical touch event. Such physical touch sensors 120 may be implemented by piezoelectric sensors known in the art.

Figure 3A:
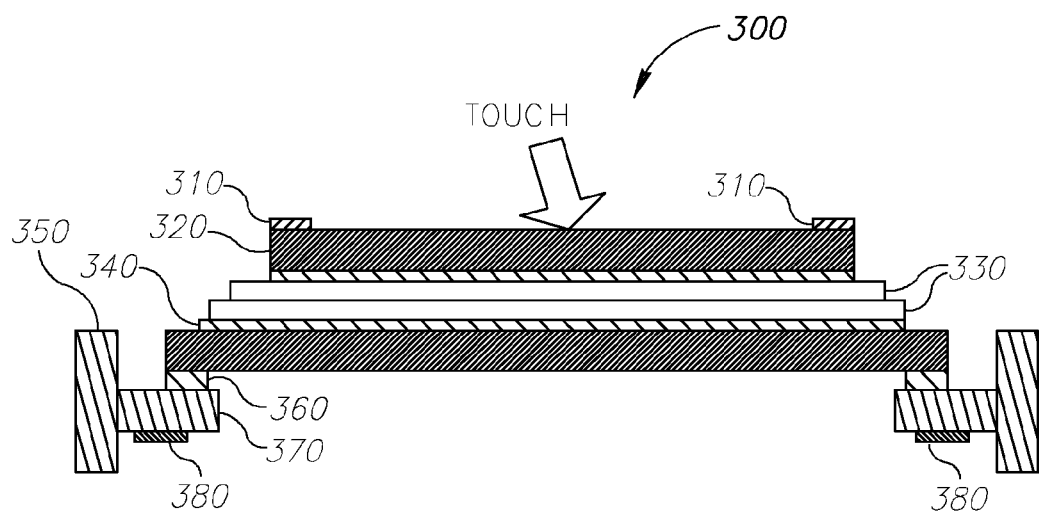
FIGS. 3A and 3B shows cross sections of yet another embodiment of the hybrid touch screen illustrating one aspect of the present invention.
Figure 3B:
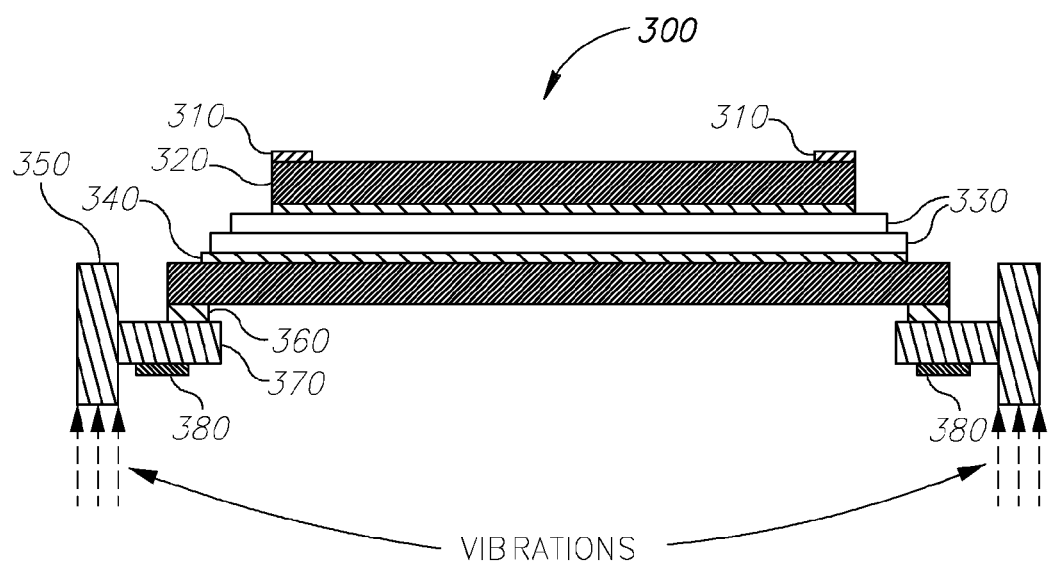

FIGS. 3A and 3B shows cross sections of yet another embodiment of the hybrid touch screen illustrating one aspect of the present invention. In touch screen 300, the plurality of the physical touch sensors include at least one frontal physical touch sensor 310 physically coupled via a glass layer 320 to a side of the panel display 330 (e.g., LCD) facing a viewer and at least one rear physical touch sensor 380 physically coupled to a frame elements 370, 350 located on the side of the panel display 330 opposite the viewer. Frame elements 370, 350 may be coupled to display panel via visco-elastic polymer 360 that is usable for damping vibrations.

In a case of a physical touch event as shown in FIG. 3A the outcome effect will propagate from the front panel through the damping material towards the mechanical support. Frontal physical touch sensors 310 will monitor stronger response than rear physical touch sensors 380. In a case of vibration/shock as shown in FIG. 3B the shockwaves will propagate in the opposite direction, i.e., from the mechanical support and frame elements 350 and 370 through the damping material 360 towards the front panel. In this case rear physical touch sensors 380 array will monitor stronger response than frontal physical touch sensors 310 due to the damping.

By comparing the two responses, by the computer processor a physical touch event can be differentiated from a mechanical vibration. The comparison can be based (but not limited to) on the peak amplitude, phase shift, time shift, signal shape, width and the like. The mathematical treatment of the comparison may include be subtraction, dividing, transformation, logical operation, and the like.

It is understood that the aforementioned structure of touch screen 300 is presented here by way of example only. The same logic may be applied to different structures. A generalized method for differentiating a true touch event from vibrations may include the following stages: obtaining physical touch from a frontal side of the touch screen and from a rear side of the touch screen and comparing the physical touch signals coming from the frontal side of the touch screen with the physical touch signals coming from the rear side of the touch screen, so as to determine a spatial direction of a source of the mechanical impact. The method may further include the stage of determining an intentional touch event only in a case that the determined direction is the frontal side of the touch screen.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A hybrid optical-physical touch screen configured to distinguish between a touch event and other vibrations, comprising:
   an electronic panel display;
   one or more optical sensors located in and coupled to an optical touch plane, parallel to the plane of the electronic panel display but displaced from it, said one or more optical sensors being configured to determine, a spatial location X-Y of a physical object in the optical touch plane;
   one or more touch sensors coupled to the electronic panel display and configured to determine a physical touch event between the physical object and the electronic panel display; and
   a processor configured to compare the determined spatial location of the physical object with the determined physical touch event between the physical object and the display at a same time, and determine, based on predefined parameters associated with the spatial location X-Y, whether an intentional physical touch event between the physical object and the electronic panel display has occurred at the spatial location X-Y,
   wherein the physical touch sensors are configured to measure a mechanical frequency level of the entire electronic panel display, wherein below the predefined level, the level being predefined for the spatial location X-Y, the processor determines a physical touch event, and above a level of detected mechanical frequency of the electronic panel display, the processor determines other vibrations.

2. The touch screen according to claim 1, wherein the touch sensors comprise sensors which are sensitive to at least one of: force/pressure change, bending, deflection, shockwave, acoustic pulse/wave, and dispersive signal.

3. The touch screen according to claim 1, wherein the predefined parameters are updated and taken into account in real time.

4. The touch screen according to claim 1, wherein the physical touch sensors are usable to reduce premature optically detected touch events.

5. The touch screen according to claim 1, wherein the predefined parameters include a predefined threshold being a minimal level of physical touch signal that is associated with an intentional touch event by the physical object.

6. The touch screen according to claim 1, wherein the predefined parameters include predefined set of ranges of level of physical touch signals, each range associated with a different spatial location X-Y on the display.

7. The touch screen according to claim 1, wherein the predefined parameters include a type of functionality presented on the display at the detected X-Y spatial location in view of a predefined level of physical touch signals assigned to the type of functionality.

8. The touch screen according to claim 1, wherein the physical touch sensors are positioned along a circumference of the electronic display panel so as to not interfere with a viewable portion of the electronic panel display.

9. The touch screen according to claim 8, wherein the processor is further configured to compare signals captured by the at least one frontal sensor and the at least one rear sensor.

10. The touch screen according to claim 1, wherein the one or more touch sensors further comprise at least one frontal touch sensor coupled to the side of the panel display facing a viewer and at least one rear touch sensor physically coupled to other side of the panel display.

11. The touch screen according to claim 10, wherein the processor is further configured to differentiate a mechanical vibration from a physical touch event, based on the comparison.

12. The touch screen according to claim 10, wherein the processor is further configured to determine a spatial direction of a source of the physical touch, based on the comparison and the detected X-Y spatial location.

13. The touch screen according to claim 10, wherein the processor is configured to determine an intentional touch event only in case that the determined direction is the frontal side of the electronic panel display.

14. A method of validating an intentional physical touch event in an electronic panel display, the method comprising:
  optically detecting an X-Y spatial position of a physical object in an optical touch plane parallel to the plane of the electronic panel display;
  obtaining touch signals from one or more touch sensors coupled to the electronic panel display;
  comparing the X-Y position with the obtained physical touch signals; and
  determining, based on the comparison and predefined parameters associated with the X-Y spatial position, whether an intentional physical touch event between the physical object and the electronic panel display has occurred at the X-Y spatial position,
  wherein the physical touch sensors are configured to measure a mechanical frequency level of the entire electronic panel display, wherein above a level, predefined for the X-Y spatial position, of detected mechanical frequency of the electronic panel display, the processor determines vibrations, and below the predefined level, the processor determines a physical touch event.

15. The method according to claim 14, wherein the predefined parameters associated with the X-Y spatial position include a predefined threshold being a minimal level of a physical touch that is associated with an intentional physical touch event by the physical object.

16. The method according to claim 14, wherein the predefined parameters include predefined set of ranges of level of physical touch signals, each range associated with a different X-Y location on the electronic panel display.

17. The method according to claim 14, wherein the predefined parameters include a type of functionality presented on the electronic panel display at the detected X-Y location in view of a predefined level of physical touch signals assigned to the type of functionality.

18. The method according to claim 14, wherein the predefined parameters are updated and taken into account in real time.

19. The method according to claim 18, further comprising determining an intentional touch event only in a case that the determined direction is the frontal side of the touch screen.

* * * * *